United States Patent [19]
Pellegrino et al.

[11] Patent Number: 5,563,569
[45] Date of Patent: Oct. 8, 1996

[54] FILAMENT TRANSFORMERS FOR PORTABLE X-RAY INSPECTION UNITS

[75] Inventors: Anthony J. Pellegrino, New Fairfield; Donald E. Sharpe, Woodbury, both of Conn.

[73] Assignee: Thermo Trex Corporation, San Diego, Calif.

[21] Appl. No.: 227,118

[22] Filed: Apr. 13, 1994

Related U.S. Application Data

[62] Division of Ser. No. 860,004, Mar. 30, 1992, Pat. No. 5,335,161.

[51] Int. Cl.⁶ .................................................. H01F 27/30
[52] U.S. Cl. ........................................ 336/198; 336/206
[58] Field of Search ................................... 310/214, 215; 336/206, 198, 208

[56] References Cited

U.S. PATENT DOCUMENTS

| | | |
|---|---|---|
| 1,585,448 | 5/1926 | Weed ...................................... 336/198 |
| 2,421,444 | 5/1947 | Tyne . |
| 2,485,745 | 8/1949 | Koonz . |
| 3,240,848 | 11/1966 | Burke . |
| 3,419,837 | 12/1968 | Marshall ................................. 336/206 |
| 3,679,926 | 7/1972 | Simmonds et al. ..................... 310/214 |
| 3,789,337 | 1/1974 | Sheppard ............................... 336/206 |
| 4,095,205 | 6/1978 | Schroeder et al. ...................... 336/206 |
| 4,146,858 | 3/1979 | McDermott ............................ 336/206 |
| 4,449,111 | 5/1984 | Nakajima ............................... 336/206 |
| 5,061,835 | 4/1991 | Iquchi . |

*Primary Examiner*—Thomas J. Kozma
*Attorney, Agent, or Firm*—Ware, Fressola, Van Der Sluys & Adolphson

[57] ABSTRACT

A high voltage step-up transformer incorporating dual insulating layers, a relatively thick, heat-resistant "TEFLON" layer exhibiting extremely low dielectric losses and a thinner epoxy layer having a tractive, non-skid outer surface supporting a large plurality of fine wire secondary winding turns.

9 Claims, 8 Drawing Sheets

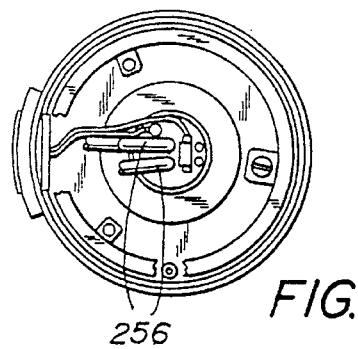
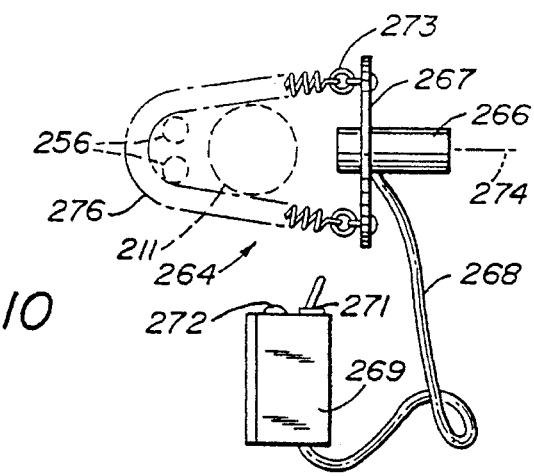
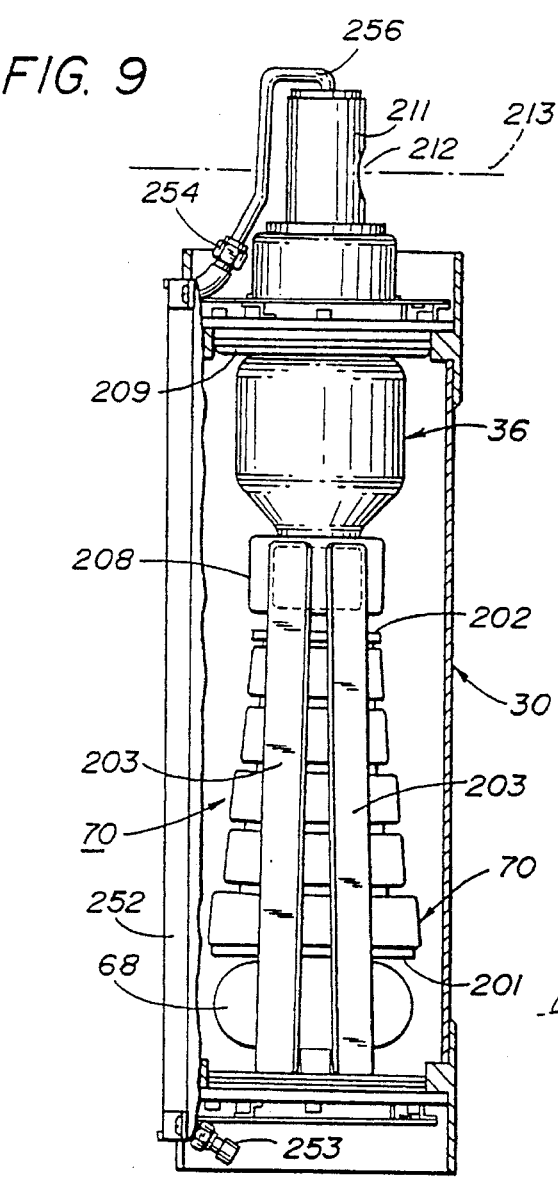
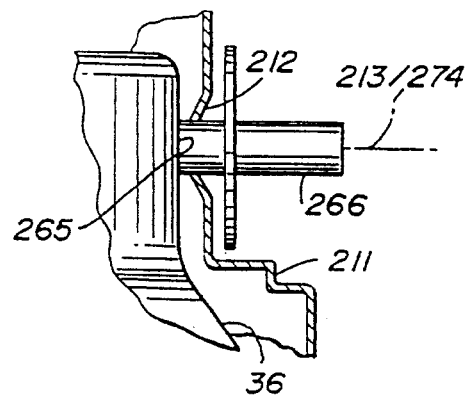
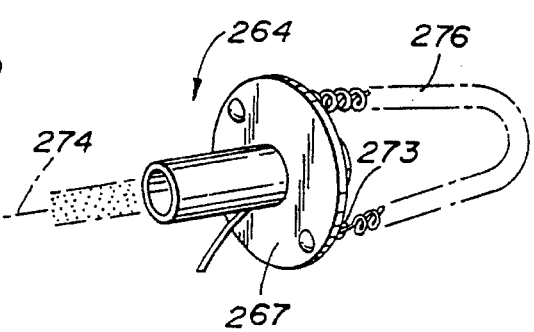

FIG. 14
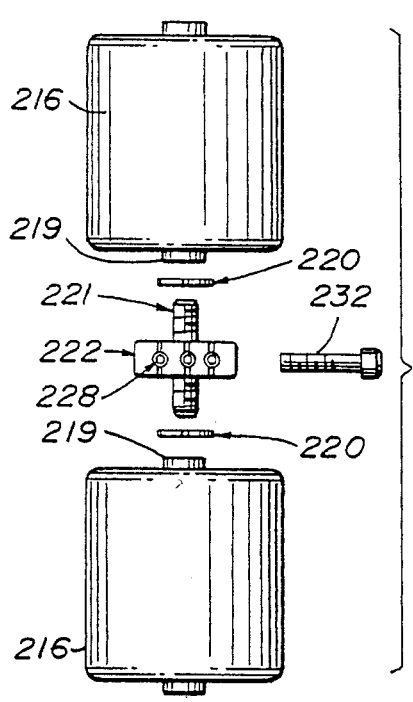
FIG. 15   FIG. 16
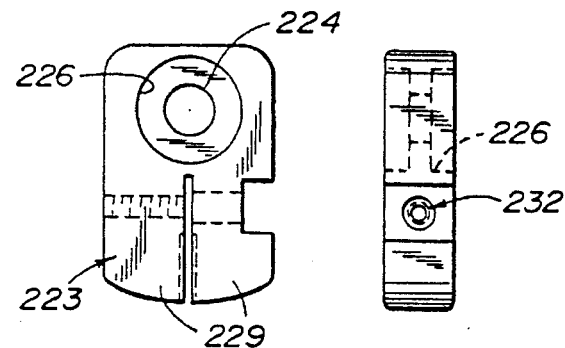
FIG. 17   FIG. 18
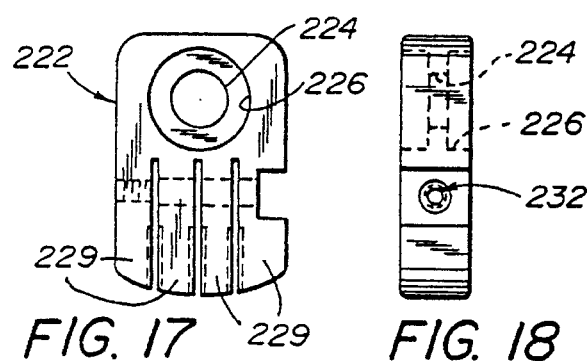
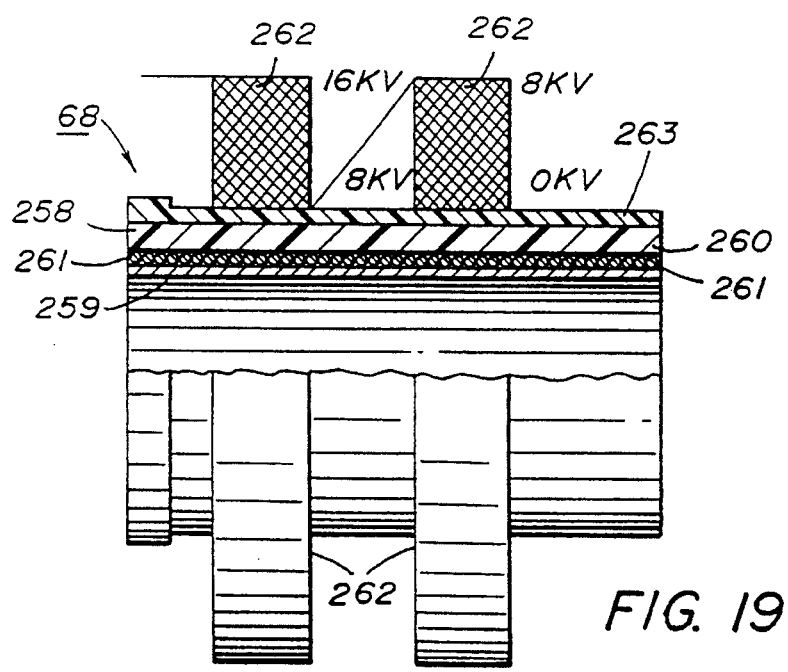
FIG. 19

FILAMENT TRANSFORMERS FOR PORTABLE X-RAY INSPECTION UNITS

This is a divisional of application Ser. No. 07/860,004 now U.S. Pat. No. 5,385,161 filed on Mar. 30, 1992.

This invention relates to unusually lightweight portable X-ray machines of the kind used in industrial noninvasive inspection for defects, discontinuities, voids or cracks in manufactured products or machines such as aircraft fuselages, jet aircraft engines or other products. More particularly, this invention relates to such portable X-ray units which may be conveniently stored and moved over long distances, and deployed in the field with ease and convenience to perform such X-ray examination of vehicles, tanks, piping, structures, machines or other devices at successive different locations.

BACKGROUND OF THE INVENTION

Conventional portable X-ray equipment is heavy, bulky and inconvenient to move and deploy for use. The high voltage required to operate the X-ray tube customarily requires extremely large and heavy electrical components to provide the desired stepped up direct current driving voltage for the X-ray tube. For this reason, operation of X-ray inspection equipment in the field has involved considerable inconvenience for the user. Consequently, a significant need has developed for lightweight, portable X-ray inspection equipment which can be readily stored, transported, deployed and used at successive different field locations.

BRIEF SUMMARY OF THE INVENTION

The devices of the present invention have proved highly useful in providing ample X-radiation for X-ray inspection purposes in the field, while requiring extremely lightweight and convenient control circuitry and cooling unit subassemblies, all easily portable. The electrical circuitry and systems incorporated in the devices of this invention are believed to exemplify several unique features, and the use of a high frequency input signal, preferably at about 25 kHz, for a multi-stage voltage multiplier, producing a 160 kV DC output voltage, achieves unexpectedly smooth, unvarying DC output with no more than 1% variation in voltage. The precise DC voltage produced is controlled within close tolerances, utilizing unique control circuitry and a voltage divider feedback loop.

In parallel with the multi-stage voltage multiplier is a multi-stage filament transformer producing very low amperage AC filament heating output currents for the X-ray tube filament. By operating at an even higher frequency, preferably about 33 kHz, very lightweight transformer stages are employed in this filament transformer array, and circuit noise or crosstalk between the high voltage DC multiplier stages and the filament transformer stages can be reduced to a minimum or virtually eliminated.

By utilizing this multi-stage, preferably a five-stage, filament transformer, maximum voltage between the primary and secondary windings of each transformer stage is limited to 32 kV, thus reducing the dielectric volume and weight of the insulation between transformer windings. In the same manner, the five-stage voltage multiplier also limits the voltage between successive stages to 32 kV, permitting minimum size, volume and weight of insulation and capacitive dielectric material employed in the voltage multiplier components.

Each stage of the voltage multiplier employs three capacitors and eight separate diodes. The input transformer employed to provide the stepped up AC input voltage of 500 volts delivered to the five-stage voltage multiplier incorporates a unique transformer winding tube with unexpectedly useful properties. The secondary winding of each filament transformer stage, connected to the primary winding of the next succeeding stage, has its DC potential matched to that produced by the corresponding stage of the DC voltage multiplier, by being connected to the corresponding interstage junction of the multiplier. A unique form of clamping connector is incorporated joining the smoothly rounded components in these assemblies to assure sound reliable electrical connections while minimizing arcing or corona discharges, and this unique connector cooperates with the threaded interconnection between successive ceramic insulated capacitors in the voltage multiplier to produce an unusually lightweight multiplier forming a sturdy structural component of a unified combined multiplier filament transformer combination.

A companion device employed with the portable X-ray systems of this invention is a laser target selector attachment, easily fitted on the anode end of the X-ray tube and uniquely adapted to seat thereon and project a narrow laser beam in the direction of the axis of the X-radiation emitted by the X-ray tube. This laser target selector easily and conveniently permits the user to adjust the position of the portable X-ray tubehead in the systems of this invention for extremely accurate aiming, and for positioning of an X-ray film holding cassette.

Accordingly, a principal object of the present invention is to provide lightweight and highly effective X-ray inspection units which are easily stored, transported, deployed and used in the field at different successive inspection sites.

A further object of the invention is to provide such X-ray inspection units having an X-ray tubehead mounted on an easily moved portable stand and connected to portable control and portable cooling portions of the assembly by cables and cooling liquid conduits.

Another object of the invention is to provide such portable X-ray inspection units incorporating X-ray tubeheads which are unusually compact, small and comparatively light in weight.

Another object of the invention is to provide such portable X-ray inspection units which are capable of providing high voltage DC operating potential for the X-ray tube in the neighborhood of 160 kV with minimum voltage variations.

Still another object of the invention is to provide such portable X-ray inspection units exhibiting minimum cross talk or interference between the filament heating AC voltage applied to the filament of the X-ray tube, and the high voltage DC operating potential applied between cathode and anode of the X-ray tube.

A still further object of the invention is to provide such portable X-ray inspection units incorporating electrical components of unusually light weight and sturdy design.

Still another object of the invention is to provide such portable X-ray inspection units having lightweight power supply and filament transformer circuitry enclosed together with the other lightweight electrical components and the X-ray tube in a compact tubehead of comparatively small size and light weight.

A further object of the invention is to provide such portable X-ray inspection units with power supply components connected together by sturdy, compact and easily operated connectors.

Another object of the invention is to provide such portable X-ray inspection units equipped with a laser target selector which is readily mounted on the X-ray tubehead itself, and easily aimed and observed to facilitate the selection of target areas for the X-ray inspection to be performed.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

THE DRAWINGS

For a fuller understanding of the nature and objects of the invention, reference should be made to the following detailed description taken in connection with the accompanying drawings, in which:

FIG. 9 is a cross sectional elevation view of the tubehead of FIG. 1A and FIG. 2 with the voltage multiplier assembly of FIG. 6 being shown in its installed position inside the tubehead, together with the X-ray tube and its cooling manifold and connections;

FIG. 10 is a top plan view of the tubehead of FIG. 9;

FIG. 11 is a top plan view of a laser target selector suitable for use with the tubehead of FIG. 9;

FIG. 12 is a fragmentary schematic view showing the laser target selector of FIG. 11 installed in its position in contact with the beryllium window at the anode X-ray emitting portion of the X-ray tube of FIG. 9;

FIG. 13 is a perspective view showing the construction of the laser target selector attachment of FIGS. 11 and 12;

FIG. 14 is a fragmentary exploded elevation view of two capacitors and their connecting components from a capacitor column array as shown in FIGS. 6–9.

FIGS. 15 and 17 are top plan views of multiprong clamping connectors utilized in the assembly of FIGS. 9–14;

FIGS. 16 and 18 are corresponding side elevation views of the connectors shown in FIGS. 15 and 17 respectively; and FIG. 19 is a side elevation view, partially in cross section, of one of the two segments of the high voltage step up transformer providing input voltage to the first stage of the DC voltage multiplier.

BEST MODE FOR CARRYING OUT THE INVENTION

Figure 4:
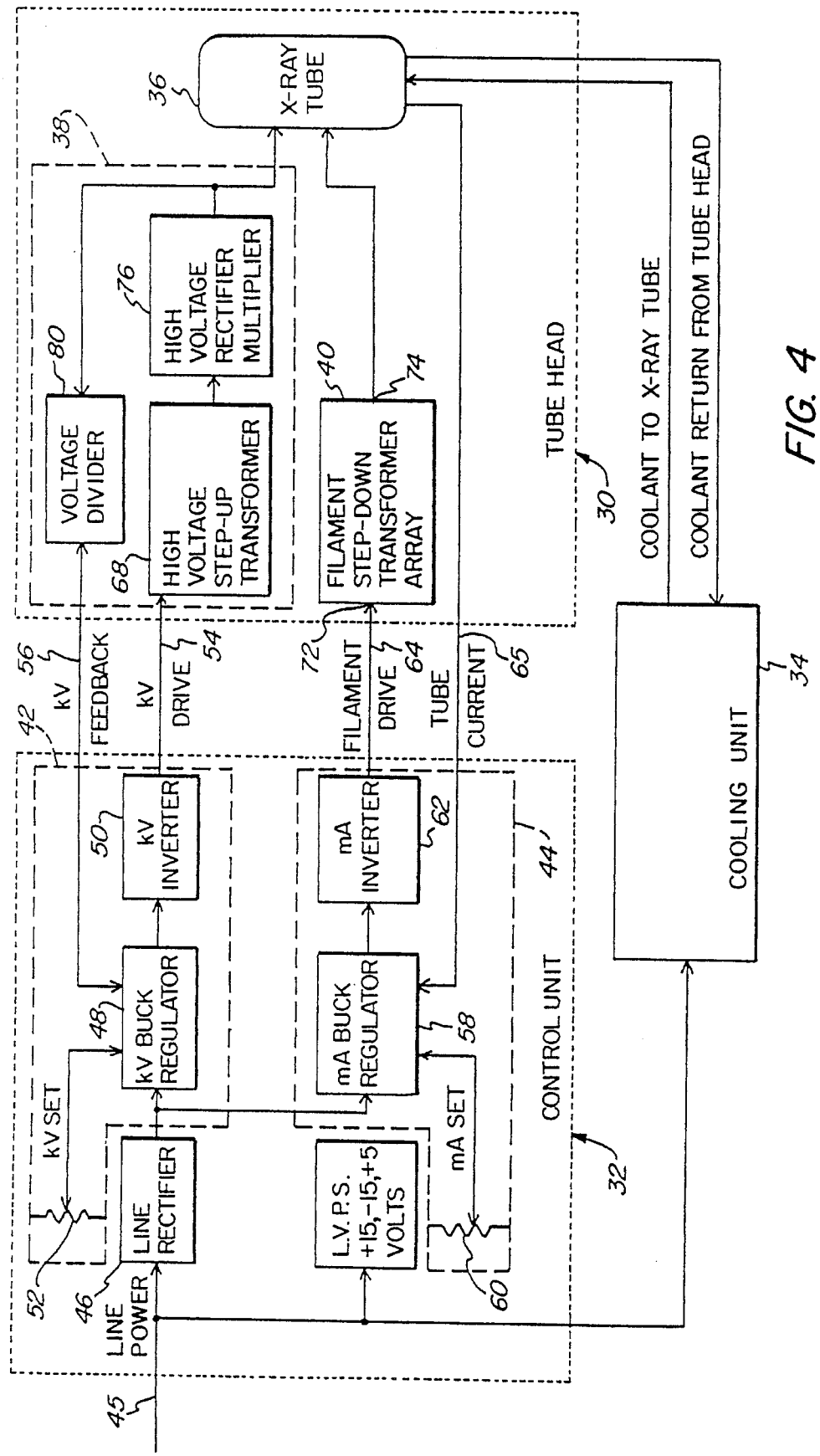
FIG. 4 is a block diagram of the components incorporated in each of the blocks of the block diagram illustrated in FIG. 2.
Figure 5:
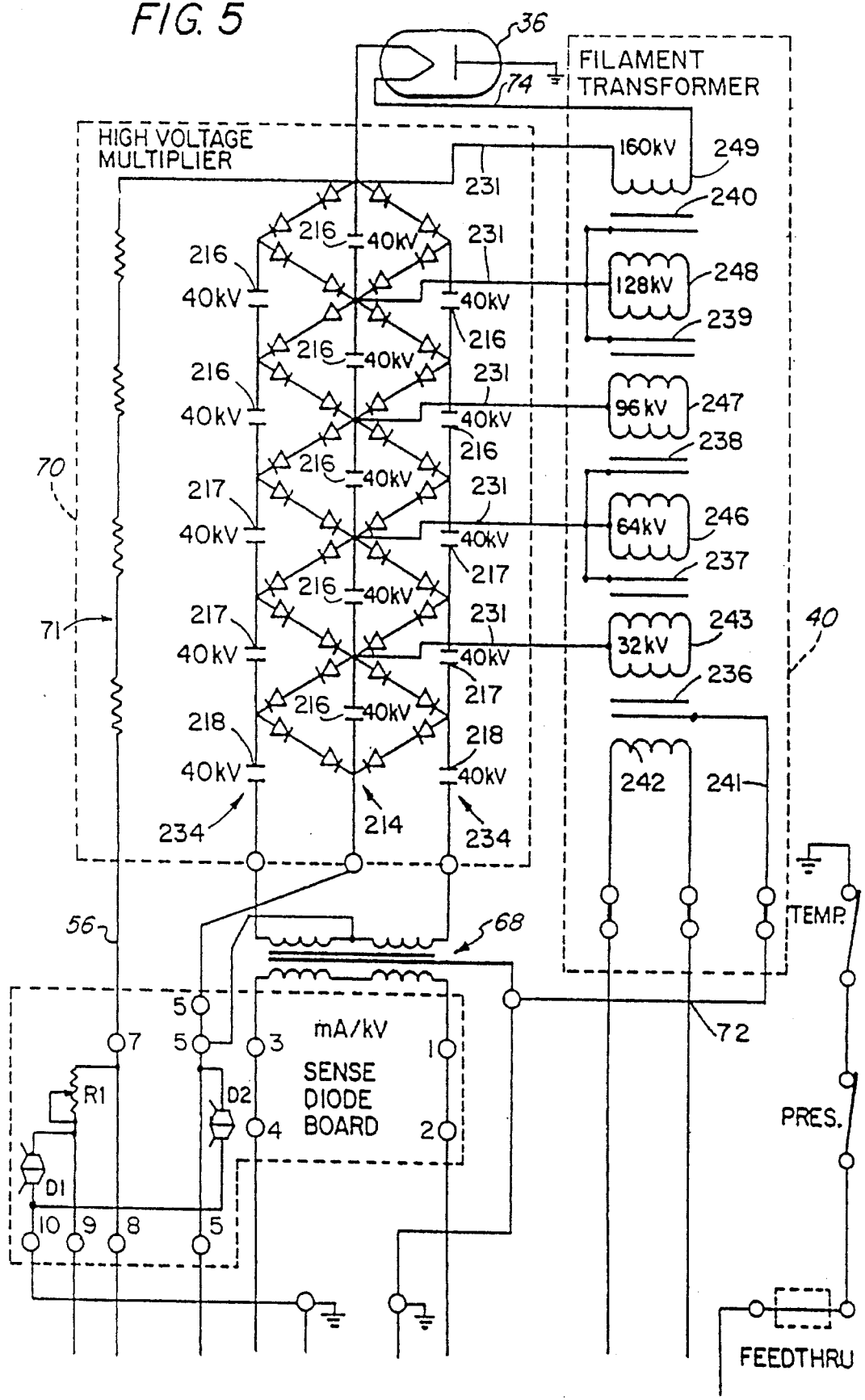
FIG. 5 is a schematic diagram of the components incorporated in the tubehead portion of the X-ray inspection units illustrated in the previous figures.

The circuitry illustrated schematically in FIGS. 4 and 5 produces the desired DC operating potential across the electrodes of the X-ray tube 36, employing a high voltage DC power supply 38 including the high voltage step up transformer 68, a multistage high voltage rectifier multiplier 70 and a voltage divider 71 in parallel with the multistage multiplier 70 with control circuitry maintaining the DC output voltage of the multiplier at a constant DC level within extremely close tolerances.

The input transformer 68 receives a square wave input at a frequency preferably between 22 and 28 kHz, and desirably at a frequency of substantially 25 kHz. In parallel with the multiplier 70 inside the X-ray tubehead 30 enclosing the multiplier and the X-ray tube 36 there is provided a filament step down transformer 40 which is also subdivided into a plurality of stages corresponding to the number of stages employed in the multiplier 70. In the figures, a five-stage multiplier 70 and a five-stage filament transformer 40 are illustrated with interstage junctions in each of these arrays respectively joined together by electrical conductors maintaining the interstage junctions at the same DC voltage levels for multiplier 70 and transformer 40. Each of these successive levels is nominally 32 kV DC above the potential of the previous interstage junction, so that each of the plurality of five stages illustrated in the figures has a limit potential of 32 kV over its two terminal junctions. The filament drive conductor 64 delivering AC input voltage to the filament transformer 40 is provided by control unit 32 with an AC input voltage at a frequency preferably between 30 and 36 kHz, and most desirably at a frequency of substantially 33 kHz. By this means, crosstalk and noise between the respective 25 kHz and 33 kHz frequencies of the multiplier 70 and the filament transformer 40 are minimized or eliminated.

These relatively high operating frequencies for the two multistage arrays permit the use of unusually small, compact and lightweight components in these two arrays, as hereinafter described. The components forming the high voltage DC multiplier delivering nominally 160 kV potential to the electrodes of the X-ray tube 36 are shown schematically in FIG. 5 and also in the assembly views of FIGS. 6, 7, 8 and 9. As shown in these figures, the five-stage multiplier of FIG. 5 employs fifteen ceramic insulated capacitors arrayed and anchored together in three generally vertical columns, sturdily anchored together between a lower mounting plate 201 and an upper mounting plate 202.

Figure 6:
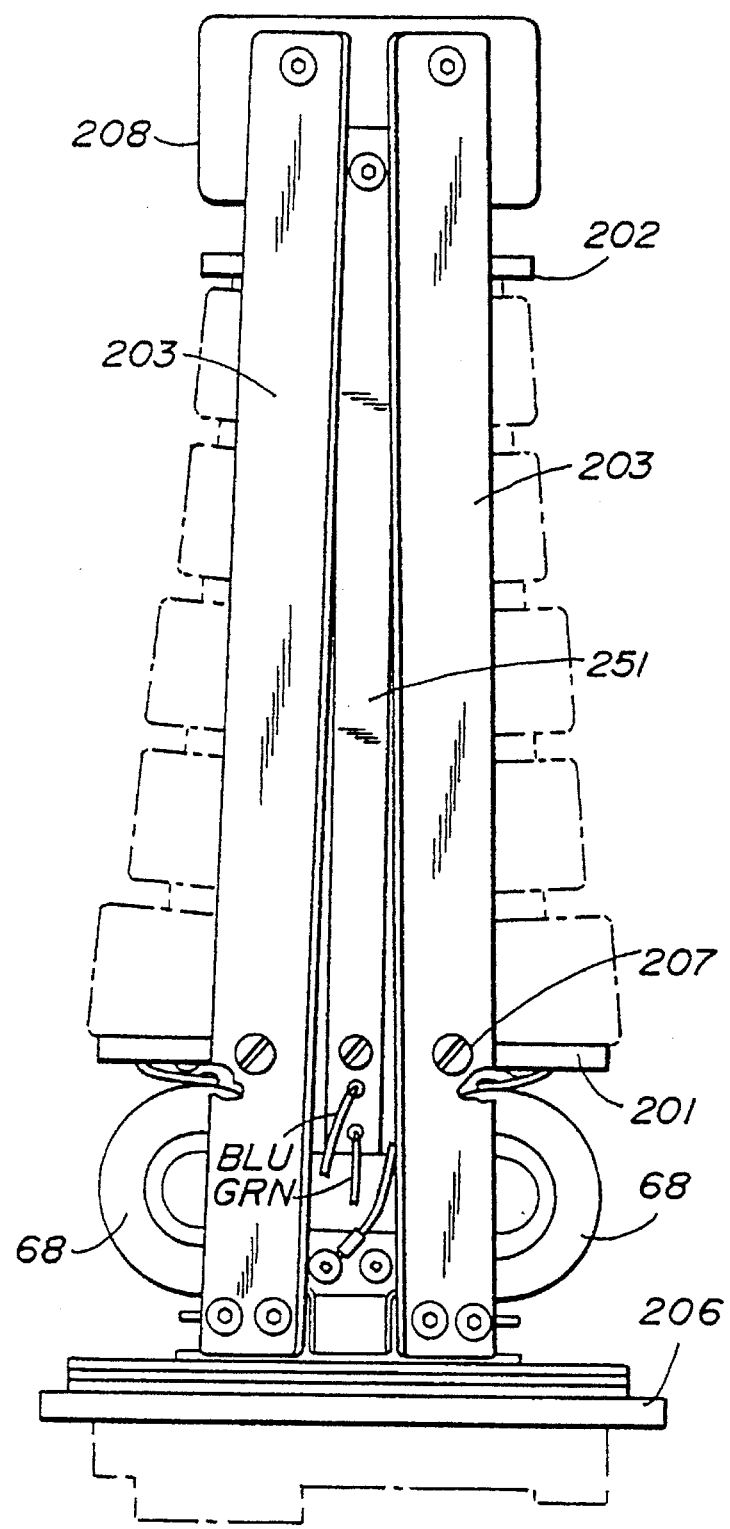
FIG. 6 is a fragmentary front elevation view of the voltage multiplier portion of the circuitry components mounted inside the tubehead illustrated schematically in FIG. 5.

This entire multiplier assembly 70 is supported via bottom plate 201 between four substantially vertical insulator stringer bars 203, best seen in FIG. 6 and FIG. 9, whose lower ends are mounted by machine screws 204 to a sturdy metal bottom end plate 206. Lower mounting plate 201 is spaced upward above bottom end plate 206 by a distance sufficient to accommodate the high voltage step up transformer 68 providing input voltage to the multiplier 70 as shown in FIG. 6. Nylon screws 207 passing through bars 203 are threaded radially into tapped radial holes formed in the edge of lower mounting plate 201, sturdily positioning the entire multistage multiplier assembly 70 in position.

The upper ends of bars 203 are secured to an annular tube socket 208 in which the X-ray tube 36 is mounted, as indicated in FIGS. 6 and 9. Bottom end plate 206 thus forms the lower end of tubehead 30 and an annular X-ray tube support plate 209 firmly positions the upper end of tube 36 at the upper end of tubehead 30. An external X-ray port shield 211 protrudes upward from the upper end of tubehead 30, enclosing the extended upper end of tube 36. Shield 211 is provided with a port 212, through which X-rays produced in tube 36 are delivered through a beryllium window to the target along a radiation axis 213.

Figure 7:
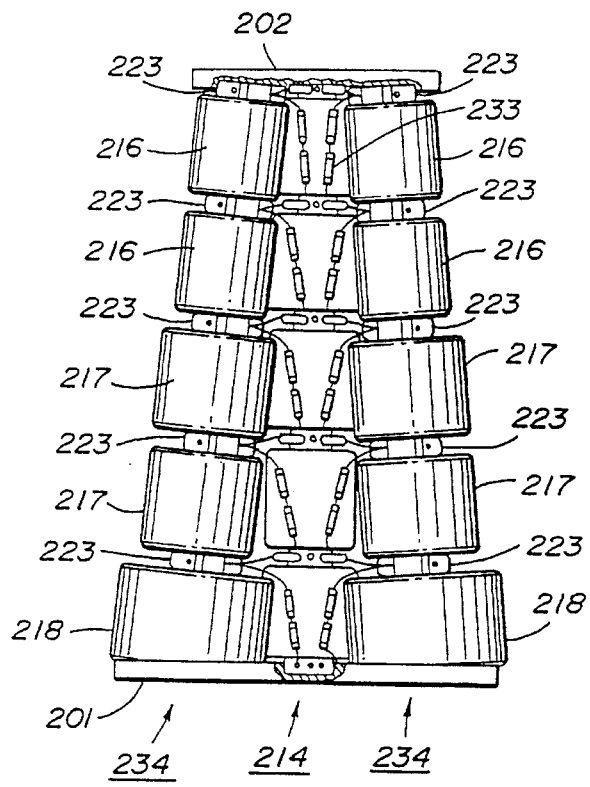
FIG. 7 is a partial cutaway view of the capacitors and diodes arrayed between upper and lower support plates in the assembly shown in FIG. 6.
Figure 8:
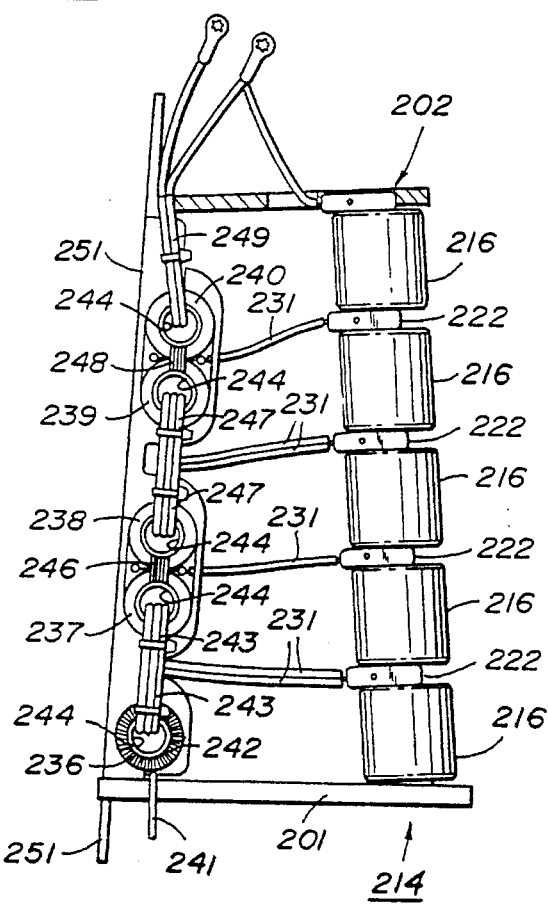
FIG. 8 is a fragmentary side elevation view showing one of the column array capacitor assemblies and the filament transformer assembly in the voltage multiplier of FIG. 6 with the other two column array capacitor assemblies being removed for clarity.

The cutaway views of FIGS. 7 and 8 illustrate the construction of the multistage voltage multiplier 70 and the adjacent positioning of the filament transformer assembly 40 with the interstage junction connections between both of these arrayed multistage assemblies 40 and 70.

The three columns of five Ceramite® ceramic insulated capacitors, securely anchored together in column arrays, are illustrated in FIGS. 7 and 8. FIGS. 8 shows the central capacitor column 214 composed of five identical capacitors 216 of 440 pf. These capacitors 216 form the central capacitor column shown in FIG. 8 and also in FIG. 5, and the same 440 pf capacitors 216 comprise the top two capacitors of each of the two outer five-capacitor columns 234, as shown in FIGS. 4 and 7. In these two flanking outer capacitor columns, the next two lower capacitors in each column are 700 pf capacitors 217, and the lowermost capacitor in each of these two outer flanking columns is a 1300 pf capacitor 218, notably larger in size than the other capacitors.

The terminal connections of these ceramic insulated capacitors 216, 217 and 218 are formed as internally threaded ferrules 219 protruding axially from each end of the cylindrical ceramic insulated capacitors, as indicated in FIG. 14. Each capacitor is joined to the next adjacent capacitor by a threaded rod 221. As indicated in the exploded view of FIG. 14, a multiprong connector 222 or a dual prong connector 223 is provided with a stepped mounting bore 224 passing through one end accommodating threaded rod 221, with enlarged portals 226 at each end of mounting bore 224 each accommodating a lock washer 227. Thus, as indicated in FIG. 14, a connector 222 or 223 is loosely mounted on threaded rod 221, which extends through its bore 224. Sandwiched between the connector and the adjacent ceramic insulated capacitor in which threaded rod 221 is threadedly inserted is a lock washer 220.

Thus, FIG. 14 shows that a sandwich construction of two lock washers with a connector between them, all mounted on threaded rod 221, is interposed between each adjacent pair of capacitors, whose threading assembly on threaded rod 221 clamps lock washers 227 within portals 226 between connector 222 or 223 and the threaded ferrule 219 of the adjacent capacitor.

Inserted between the prongs of each of the connectors 222 and 223 is a connector sleeve 228 which slides between and fits with close tolerances into the slots between adjacent prongs 229 of the connector 222 or 223. Connector sleeve 228 is dimensioned to receive insulation-stripped conductor wire 231. As indicated in FIG. 8, one or two stripped conductor wires 231 may be inserted and soldered in each sleeve, and thereby electrically connected between the prongs of the connector 222 or 223 which are clamped together on the sleeve to complete the electrical connection by the insertion of a threaded set screw 232. Connectors 222 and 223 are preferably made of resilient brass, which is not stressed beyond its elastic limit but is deformed sufficiently by the insertion and tightening of the set screw 232 that the prongs 229 are flexibly drawn together to provide excellent electrically conductive clamping attachment of sleeves 228 and conductors 231 with connector 222 or 223.

The connectors and capacitors shown in the disassembled exploded view of FIG. 14 are shown assembled in the overall assembly of the central capacitive column array in FIG. 8, where connectors 222 are easily visible sandwiched between each adjacent pair of capacitors 216. The four prong connectors 222 are well suited for this purpose because of the sheer number of electrical conductors joined to each other at the interstage junctions between capacitors in the array 214. As indicated in FIG. 5, two capacitor terminals and five separate conductor wires are all joined together at each of the interstage junctions of the multiplier 70.

The five conductor wires which are joined at each interstage junction of the multiplier 70 include the bridging conductors 231 extending between the filament transformer assembly 40 and the central capacitor column 214, as clearly shown in FIG. 5 and FIG. 8, and also the conductor wire extending from each of the diode strings into these interstage junctions. A total of forty high voltage rectifier diodes 233 are arrayed in the pattern clearly indicated in FIG. 5 in a manner believed to be relatively conventional for high voltage multistage multipliers.

The dual prong connectors 223 are also well adapted to receive two insulation stripped conductive wires inserted in a central sleeve 228 which is sandwiched between the two prongs 229 of the connector 223 and securely held in position by its set screw 232. These dual prong connectors 223 are well adapted to join the conductor wires from each diode string to the junction between the ceramic insulated capacitors arrayed forming the two outer columns 234, flanking the central column 214, and the junction connections are made in the same way illustrated in FIGS. 8 and 14, with the connectors being clamped solidly between each adjacent pair of capacitors threaded on the threaded rod 221, with a lock washer 220 sandwiched between each connector and the adjacent capacitor. The three capacitor columns 214 and 234 are clearly shown in FIG. 7, where the diode strings are also clearly illustrated as well as the two-prong connectors 223.

Filament Transformer

The filament transformer 40 is clearly shown in FIG. 8. Five ferrite toroid cores 236–240, preferably coated with epoxy paint, are shown arrayed vertically up the left side of FIG. 8. For DC potential matching, the lowermost core 236 is connected to the core of high voltage step-up transformer 68 supplying input AC voltage to the multiplier 70, and both of these connected cores are also connected to ground, all as shown in FIG. 4. The ground connection is provided by a conductor 241 joined by a soldered connector plate to a surface of the ferrite core 236 from which the epoxy paint has been sanded away.

First primary winding 242 comprises thirty-six turns of No. 22 AWG wire, wound around core 236. The first secondary winding 243 is formed by a considerably larger coil of six turns of RG 58 wire, having approximately a 2"

outer diameter, wound through the center of core 236 and also through the center of second core 237, as indicated in the lower portion of FIG. 8. Both ends of winding 243 are carried across the assembly to be connected to multiprong connector 222 between the two lowermost capacitors 216 in central capacitor stack 214, as shown in FIGS. 5 and 8.

A cylinder of Teflon tubing 0.030" in thickness lines the interior of all five toroid cores 236–240, and the larger windings such as winding 243, are directed through the interior of each of these Teflon tubing core liners.

The second secondary 246 which also forms the third primary winding is formed as six turns of No. 20 AWG wire, wound over a thin layer of Kapton acrylic tape encircling cores 237 and 238. As indicated in FIG. 5, a conductor 231 is joined to this secondary winding 246 and also to sanded off portions of cores 237 and 238 assuring that all three of these components are connected to the second interstage junction of multiplier 70 and thus maintained at its nominal negative DC potential of −64 kV. Teflon tubing liner 244 is mounted overlying the six turns of winding 246 and the third secondary and fourth primary winding is formed by a second large six turn loop 247 of RG 58 wire, passing through core 238 and also through core 239, with conductors 231 from both of its ends leading to another multi-prong connector 222 between the third and fourth capacitors 216 and capacitor column 214. Finally, the fourth secondary and fifth primary winding is formed by another six turns of No. 20 AWG wire underlying Teflon tubing core liners 244, wound through both of the adjoining ferrite cores 239 and 240, with a conductor 231 joining both cores 239 and 240 as well as this winding 248 to a multi-prong connector 222 between the fourth and fifth capacitors 216 of the capacitor stack 214. The final or fifth secondary winding 249 of the filament transformer array 40 is formed by four turns of RG 58 wire again having approximately a 2" outer diameter, wound through the center of the core liner 244 in core 240, and has one end connected by a conductor to the topmost multi-prong connector 222 overlying the uppermost capacitor 216 in the center stack 214, with the other end of winding 249 being connected to the filament of tube 36, as shown in FIG. 5.

The ferrite toroid cores 236–240 are shown in FIG. 8 supported in a filament transformer mounting frame 251, formed as an elongated bar with cutouts receiving the ferrite cores. The outer rear surface of the mounting frame 251 is shown in FIG. 6, extending upward between the two nearest insulator stringer bars 203. The large size of the windings 243, 247 and 249 and the open space inside the Teflon tubing core liners 244 as well as the exposure on all sides to the surrounding atmosphere provide excellent convective and radiation cooling for the various components of the filament transformer 40.

Figure 1A:
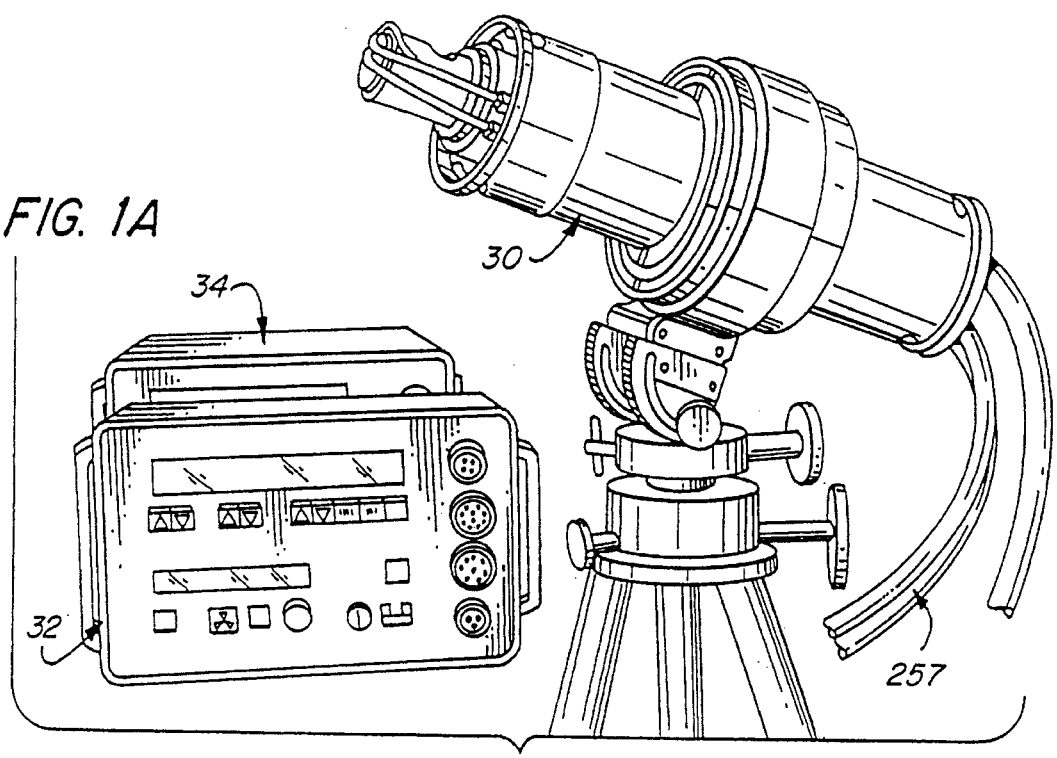
FIG. 1A is a perspective view showing a portable X-ray inspection unit of the present invention including a lightweight X-ray tubehead mounted on a tripod stand with a digital power supply control unit and a cooling unit in the background.
Figure 1B:
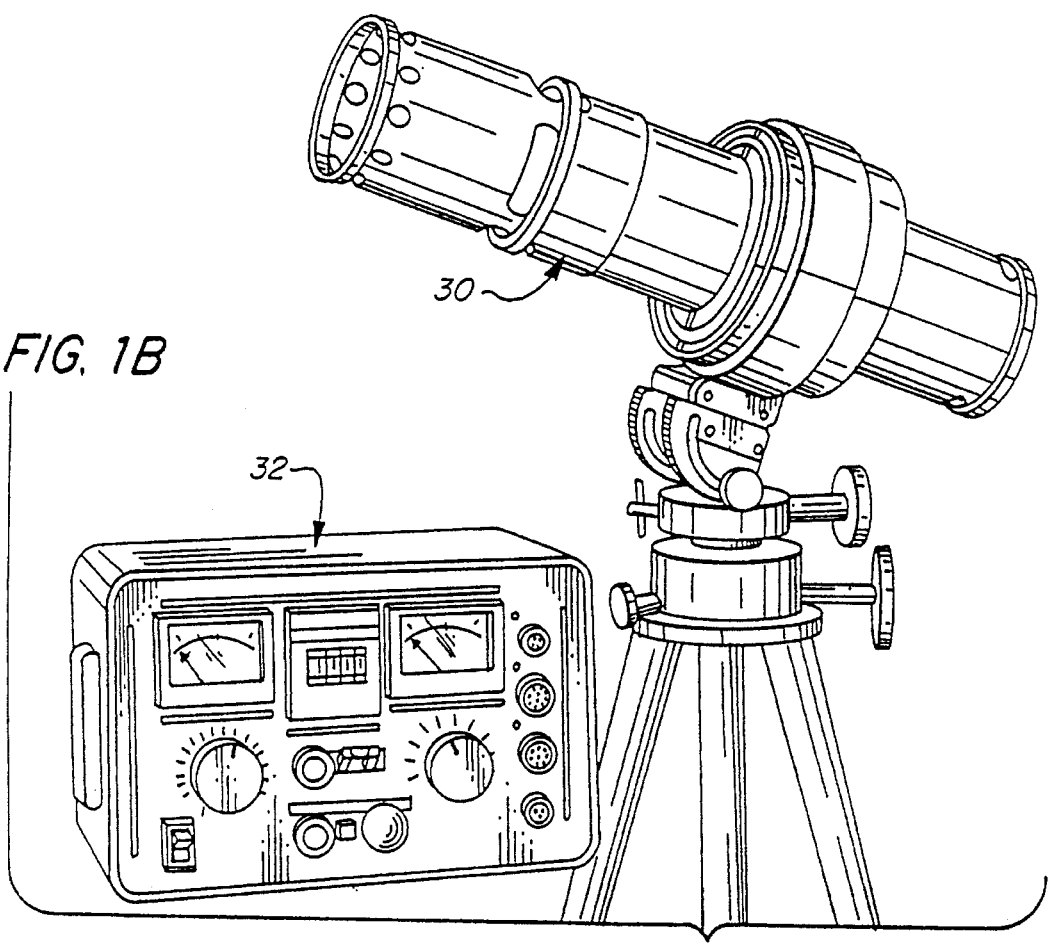
FIG. 1B is a similar perspective view of an air cooled industrial X-ray inspection unit of the present invention with an analog control unit in the foreground.
Figure 2:
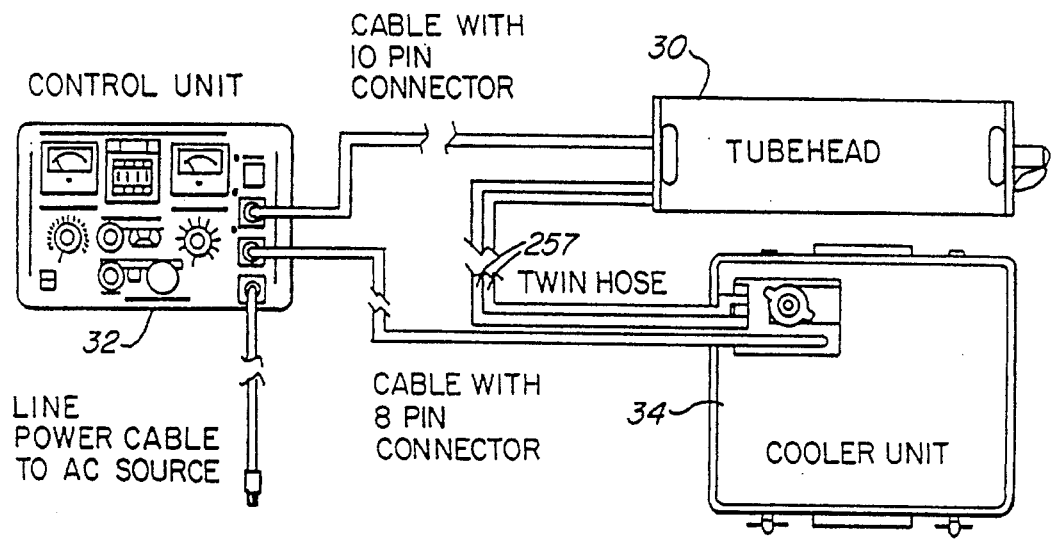
FIG. 2 is a schematic block diagram of the X-ray inspection system shown in FIG. 1A.

Mounting frame 251 itself provides the elongated outer surface shown in FIG. 6 which conveniently radiates accumulated heat to the outer shell of tubehead 30, as shown in FIG. 9, where the left-hand portion of this outer shell is illustrated as a cooling manifold 252 having a coolant tubing union connection 253 at its lower end and a similar connection 254 at its upper end joined to cooling tubes 256 employed for cooling the X-ray tube 36. Inside X-ray port shield 211 the manifold 252 is well positioned to provide heat transfer and cooling for the shell of tubehead 30 in the case of the unit illustrated in FIG. 1A and 2 where a cooler unit 34 provided with the hose connections 257 leading to the tubehead is an integral part of the overall system.

Figure 3:
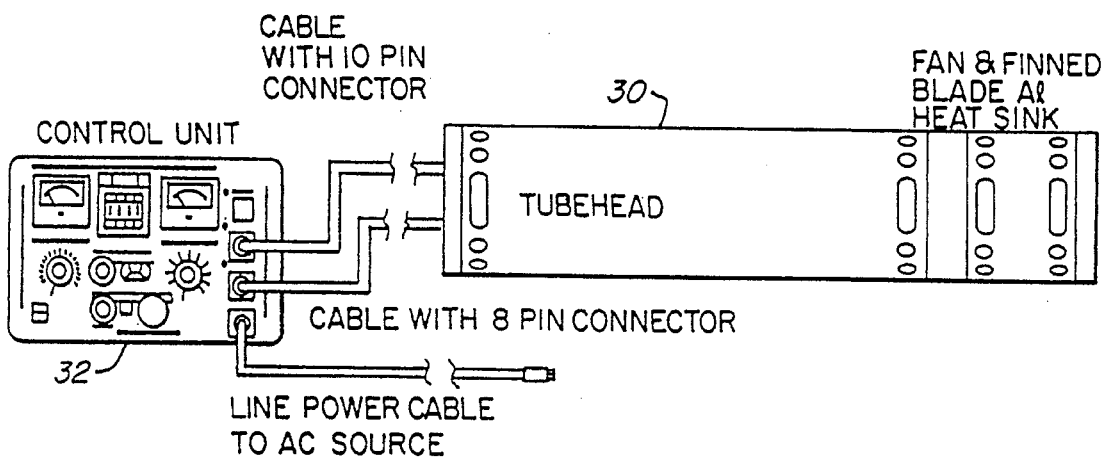
FIG. 3 is a schematic block diagram of the air cooled X-ray inspection unit shown in FIG. 1B with its control unit.

The tubehead of FIG. 3 is air cooled by an internal fan not illustrated in the figures. Twin hoses 257 shown in FIG. 2 deliver the coolant fluid from the cooler unit 34 to the tubehead 30 in the systems of FIGS. 1A and 2.

The size of the components illustrated in FIGS. 6, 7 and 8 may be visualized by reference to the smallest of the ceramic insulated capacitors 216 which measure approximately 3 centimeters in diameter and just over three centimeters in length. The tubehead dimensions are approximately 28 inches in length and just over 7 inches in diameter, with an approximate weight of 25 lbs. The unusually high frequency of the driving voltages employed both in the multiplier and the filament transformer can be credited with the very significant weight reductions compared to conventional X-ray inspection units, which are achieved by the devices of the present invention. The use of aluminum and structural plastic parts also contributes to this highly desirable weight reduction.

High Voltage Step Up Transformer

Transformer 68 supplying input voltage to the DC voltage multiplier array incorporates a unique winding tube construction. The central cylindrical tube 258 on which both primary and secondary windings are carried incorporates a unique construction. A central plastic-impregnated or coated paperboard cylinder 259 has the heavy primary winding 261 applied thereto. A relatively thick outer layer 260 preferably of Teflon forms an insulating layer directly overlying the primary winding. Teflon is preferable and uniquely useful for this purpose because of its extremely low dielectric losses, high dielectric strength and significant resistance to heat degradation. In some cases polypropylene can be used in place of Teflon, because of its low dielectric losses. Teflon presents the disadvantage, however, of being so unusually smooth that the application of the secondary winding 262 thereon would be impossible.

For this reason, a thinner outer layer of G10 epoxy forms the outer surface of the winding tube, and this epoxy outer layer 263, while having less dielectric strength and resistance to heat degradation, nevertheless provides the outermost tractive layer of the winding tube, permitting two secondary windings 262 to be firmly anchored on the outside of the epoxy layer 263.

As indicated in FIG. 6, two input transformer assemblies 68 are rubber block shock-mounted between the lower mounting plate 201 and the bottom end plate 206, providing the highly satisfactory dielectric strength required for the voltage differential between the primary and secondary windings, while assuring minimum weight for the transformer components 68. The central portion of the resulting winding tube in assembly 68 is of amply large diameter to accommodate a laminated core structure, not shown in the drawings.

FIGS. 6, 7, 8 and 14–18 all illustrate the preferred rounding of edges and corners of all components involved in the production of high voltages in order to minimize the developments of arcs or corona discharges from any remaining sharp corners or edges. It will be noticed that the ceramic capacitors, the connectors 222 and 223, the tube socket 208 and the insulator stringer bars 203 all incorporate rounded, smooth corners, edges and ends. All of these components in tubehead 30 are thus well adapted to minimize corona losses.

Laser Target Selector

A removable attachment which has been found to be highly useful with the industrial X-ray inspection units of the present invention is the laser aimer or target selector 264 illustrated in FIGS. 11, 12, and 13. As illustrated in FIG. 11, the target selector includes a very small tubular laser 266 having a radially extending mounting plate 267 mounted near its rear end, and a power cord 268 leading to a battery case 269 enclosing a 9-volt transistor battery, with a switch 271 and an on/off indicator lamp 272 beside switch 271. A pair of bails or attachment rings 273 are mounted at opposite diametric positions on plate 267 close to its edge, extending in the rearward direction away from the laser's projection axis 274. A flexible tension coil spring 276 has each of its ends secured to one bail 273, forming the assembly and shown in FIG. 11. This allows the spring to be stretched as the laser aimer 264 is lowered from above over the end of X-ray port shield 211 and cooling tubes 256, bringing the rear end of laser 266 into alignment with port 212. There spring 276 draws the laser 266 rearward until its rear end rests firmly against the beryllium window 265 through which X-radiation is delivered by X-ray tube 36 through port 212 as shown in FIG. 12. In this firm seated condition, secured by spring 276, the laser 266 can be switched on by actuating switch 271, and the laser beam projecting along the laser projection axis 274 can be observed by the user striking the object at which the laser is aimed.

Consequently, the tubehead 30 can be readjusted on its tripod and precisely positioned to bring the laser beam into close alignment with the target to be inspected. With the laser in this installed position, the laser beam axis 274 substantially coincides with the X-ray projection axis 213, as indicated in FIG. 12, and after positioning tubehead 30, the detachable laser target selector 264 may be removed merely by stretching spring 276 and withdrawing the device 264 upward from the end of the port shield 211, exposing the target area for the desired X-ray inspection.

It will thus be seen that the objects set forth above, and those made apparent from the preceding description, are efficiently attained and, since certain changes may be made in the above construction without departing from the scope of the invention, it is intended that all matter contained in the above description or shown in the accompany drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A high voltage step-up transformer incorporating
    a central hollow tubular insulator cylinder dimensioned to receive a ferromagnetic core extending therethrough;
    a primary winding of coarse-diameter wire helically wound on said insulator cylinder,
    an outer heat-resistant insulating layer of a polymer, selected from the group consisting of polytetrafluorethylene and polypropylene directly overlying in connection with and surrounding said primary winding,
    a relatively thin outer insulating layer of epoxy overlying said polymer layer, providing a tractive non-skid outer surface, and
    secondary winding means comprising a large plurality of turns of relatively fine diameter wire helically would on said epoxy layer's outer surface,
whereby a precise number of secondary turns can be readily wound on said surface, producing an economical, efficient and lightweight high voltage transformer.

2. A high voltage step-up transformer comprising:
    a ferromagnetic core;
    a cylindrical insulator tube surrounding the ferromagnetic core;
    a primary winding helically wound on the cylindrical insulator tube;
    a first heat-resistant, insulating layer, directly overlying in contact with the primary winding combining the characteristics of low dielectric losses, high dielectric strength and significant resistance to heat degradation;
    a second layer on the first layer having a tractive, non-skid surface;
    a secondary winding helically wound on the tractive, non-skid surface.

3. The high voltage step-up transformer defined in claim 2, wherein the first layer further comprises a smooth polymer selected from the group consisting of polytetrafluorothylene and polypropylene.

4. The high voltage step-up transformer defined in claim 2, wherein the second tractive, non-skid layer is epoxy.

5. The high voltage step-up transformer defined in claim 2, wherein the first layer further comprises a smooth polymer selected from the group consisting of polytetrafluroethylene polypropylene and the second layer is epoxy.

6. A high voltage step-up transformer comprising:
    a ferromagnetic core;
    a cylindrical insulator tube surrounding the ferromagnetic core;
    a primary winding helically wound on the cylindrical insulator tube;
    a smooth polymer first heat-resistant, insulating layer directly overlying in contact with the primary winding combining the characteristics of low dielectric losses, high dielectric strength and significant resistance to heat degradation;
    a tractive, non-skid second polymer layer on the smooth polymer first layer;
    a secondary winding helically wound on the tractive, non-skid second layer.

7. The high voltage step-up transformer defined in claim 6, wherein the polymer of the smooth polymer first layer further comprises a polymer selected from the group consisting of polytetrafluroethylene and polypropylene.

8. The high voltage step-up transformer defined in claim 6, wherein the tractive, non-skid second layer is epoxy.

9. The high voltage step-up transformer defined in claim 6, wherein the polymer of the smooth polymer first layer further comprises a polymer selected from the group consisting of polytetrafluorethylene and polypropylene and the tractive, non-skid second layer is epoxy.

* * * * *

UNITED STATES PATENT AND TRADEMARK OFFICE
CERTIFICATE OF CORRECTION

PATENT NO. : 5,563,569
DATED : October 8, 1996
INVENTOR(S) : A. Pellegrino et al.

It is certified that error appears in the above-indentified patent and that said Letters Patent is hereby corrected as shown below:

At column 1, line 4, after "divisional", please insert —application—; and after "of", please insert —copending—.

At column 9, lines 55-56, please delete "connection" and insert —contact—.

At column 10, lines 29-30, after "polytetrafluroethylene", please insert —and—.

Signed and Sealed this

Eleventh Day of February, 1997

Attest:

BRUCE LEHMAN

*Attesting Officer*  *Commissioner of Patents and Trademarks*